(12) United States Patent
Yamada et al.

(10) Patent No.: US 8,722,550 B2
(45) Date of Patent: May 13, 2014

(54) BASE FABRIC FOR AIR BAG, METHOD OF PRODUCING THE SAME AND AIR BAG

(75) Inventors: Tatsuro Yamada, Fukui (JP); Naokuni Iwasa, Fukui (JP); Akihiro Nogata, Fukui (JP)

(73) Assignee: Seiren Co., Ltd., Fukui (JP)

( * ) Notice: Subject to any disclaimer, the term of this patent is extended or adjusted under 35 U.S.C. 154(b) by 478 days.

(21) Appl. No.: 12/376,933

(22) PCT Filed: Aug. 23, 2007

(86) PCT No.: PCT/JP2007/066828
§ 371 (c)(1),
(2), (4) Date: Apr. 27, 2010

(87) PCT Pub. No.: WO2008/023843
PCT Pub. Date: Feb. 28, 2008

(65) Prior Publication Data
US 2010/0295283 A1    Nov. 25, 2010

(30) Foreign Application Priority Data
Aug. 24, 2006   (JP) ................................ 2006-227689

(51) Int. Cl.
*B32B 27/04*     (2006.01)
*B60R 21/16*     (2006.01)

(52) U.S. Cl.
USPC ........................ 442/76; 280/728.1; 280/743.1

(58) Field of Classification Search
CPC ............ B60R 21/16; B05D 3/02; B32B 5/02; B32B 27/04
USPC .......... 280/728.1, 743.1; 428/35.2, 36.1, 193, 428/196; 442/76, 168, 170, 171, 183, 184, 442/286; 383/3, 117; 427/393.3
See application file for complete search history.

(56) References Cited

U.S. PATENT DOCUMENTS

| | | | |
|---|---|---|---|
| 5,945,186 A * | 8/1999 | Li et al. .................... | 428/36.1 |
| 5,989,660 A | 11/1999 | Moriwaki et al. | |
| 6,037,279 A * | 3/2000 | Brookman et al. ............. | 442/71 |
| 6,673,728 B1 * | 1/2004 | Newbill ........................ | 442/218 |
| 2007/0031621 A1 * | 2/2007 | Morimoto et al. ........... | 428/36.1 |

FOREIGN PATENT DOCUMENTS

| | | | | |
|---|---|---|---|---|
| CN | 1703550 A | 11/2005 | | |
| EP | 1270800 B1 * | 10/2001 | .......... | D06M 15/693 |
| EP | 1 548 180 A1 | 6/2005 | | |
| JP | A 9-240405 | 9/1997 | | |
| JP | 2853936 | 11/1998 | | |
| JP | A 2001-288641 | 10/2001 | | |
| JP | A 2003-72499 | 3/2003 | | |
| JP | 2004-124321 | 4/2004 | | |
| WO | WO 02/061200 A1 | 8/2002 | | |

* cited by examiner

Primary Examiner — Arti Singh-Pandey
(74) Attorney, Agent, or Firm — Greer Burns & Crain Ltd.

(57) ABSTRACT

A base fabric for an air bag is provided which is light-weight, flexible, superior in stowability, air shieldability, heat resistance and flame retardancy, further superior in the adhesion to resin and difficult to undergo stitch dislocation and fray. The air bag base fabric comprises a synthetic fiber fabric at least one surface of which is coated with resin. The resin is present also over at least 85% of the total area of an intertwined portion interface as a warp-weft crossing portion of the synthetic fiber fabric.

7 Claims, 1 Drawing Sheet

BASE FABRIC FOR AIR BAG, METHOD OF PRODUCING THE SAME AND AIR BAG

This application is a U.S. National Phase under 35 U.S.C. §371 of International Application No. PCT/JP2007/066828, filed Aug. 23, 2007.

The present invention relates to an air bag attached to a vehicle and adapted to swell in an instant upon occurrence of a collision accident of the vehicle to protect the passenger concerned. More particularly, the present invention relates to an air bag using a resin-coated fabric and superior in all of flame retardancy, light-weightness, texture and stowability.

BACKGROUND OF THE INVENTION

Recently there have been developed various air bag devices for ensuring the safety of a passenger upon occurrence of an accident of traffic means, especially an automobile, and the usefulness thereof has been recognized. Consequently, air bag devices have come to be attached in a very high rate to automobiles. Such air bag devices are each made up of a sensor for sensing a state of rapid deceleration upon, for example, collision of an automobile equipped with the air bag device, an inflator which generates a high pressure gas upon receipt of a signal from the sensor, an air bag adapted to swell and develop under the high-pressure gas generated from the inflator, and a diagnosing circuit which determines whether the air bag device functions normally or not.

As examples of materials employable for the airbag there are various materials, including a coated fabric comprising a high tenacity filament fabric such as polyamide and a heat-resistant elastomer such as chloroprene coated on the fabric. By applying the heat-resistant elastomer to the surface of the fabric it is intended to improve the performance which with the polyamide fiber fabric alone is deficient, such as heat resistance, flame retardance and air shieldability. This coating process is useful also for the prevention of stitch dislocation and fray of the fabric.

However, the fabric becomes hard when coated and hence becomes difficult to be folded compactly, thus giving rise to a problem in point of stowability of the air bag. Moreover, for satisfying all of high heat resistance, flame retardancy and air shieldability, it is necessary that the amount of the heat-resistant elastomer applied per unit area of the fabric be 50 g/m$^2$ or more, thus giving rise to the problem that the weight of the air bag increases.

In an effort to solve such problems, a base fabric for an air bag with a reduced amount of the heat-resistant elastomer applied thereto is now under study. For example, in Japanese Patent No. 2853936 there is disclosed an air bag wherein an elastomer resin is localized at a film thickness ratio of 3.0 or more in a fabric stitch portion relative to 1.0 of a weaving yarn portion which constitutes a fabric. In this air bag, although the stowability thereof is improved, the adhesion between the resin coating and the fabric cannot be considered sufficient. Further, in the case where the amount of the elastomer applied is as small as 20 g/m$^2$ or less, it is difficult to satisfy the flame retardancy based on the resin coating, in such a localized state of the resin.

In JP 2004-124321A there is disclosed a base fabric for an air bag wherein at least one surface of the fabric is coated with resin and filaments in at least a part of the fabric is enclosed with the resin, while filaments in at least another part of the fabric is not enclosed with the resin. According to this fabric, although the stowability of the air bag and the adhesion between the resin coating and the fabric are improved, it cannot help being considered that the fabric is insufficient in point of flame retardancy based on the resin coating.

BRIEF SUMMARY OF THE INVENTION

The present invention has been accomplished in view of the above-mentioned drawbacks of the conventional base fabric for an air bag and it is an object of the present invention to provide a base fabric for an air bag being light-weight and flexible, satisfying high stowability, high air shieldability, high heat resistance and flame retardancy, superior in the adhesion between a resin coating and the fabric, and difficult to undergo stitch dislocation and fray, a method for producing such a base fabric, and an air bag using such a base fabric.

Having made earnest studies for solving the above-mentioned problems, the present inventors found out that, in a base fabric for an air bag comprising a synthetic fiber fabric at least one surface of which is coated with resin, it is possible, by controlling the state of distribution of the resin on the synthetic fiber fabric, to make the fabric excellent in flame retardancy, adhesion and air shieldability and difficult to undergo stitch dislocation and fray despite an extremely small amount of the resin applied. In this way the present invention has been completed.

The present invention firstly resides in a base fabric for an air bag comprising a synthetic fiber fabric at least one surface of which is coated with resin, characterized in that the resin is present also over at least 85% of the total area of an intertwined portion interface as a warp-weft crossing portion of the synthetic fiber fabric.

The present invention secondly resides in a method for producing a base fabric for an air bag, involving applying a resin solution to at least one surface of a synthetic fiber fabric for an air bag and drying and then heat-treating the coated surface, characterized in that the resin solution when applied is allowed to penetrate also into an intertwined portion as a warp-weft crossing portion of the synthetic fiber fabric, thereby applying the resin to at least 85% of the total area of an intertwined portion interface as a warp-weft crossing portion of the synthetic fiber fabric.

The present invention thirdly resides in an air bag comprising the above base fabric for an air bag.

According to the present invention, since it is possible to provide a base fabric for an air bag being light-weight and flexible, superior in all of stowability, air shieldability, heat resistance, flame retardancy and adhesion between a resin coating and the fabric and difficult to undergo stitch dislocation and fray, as well as an air bag produced using such a base fabric, the invention can contribute to promoting the spread of the air bag, further, can attain lower fuel consumption of automobiles through the reduction of weight of an air bag device, and consequently can contribute to protection of the earth environment.

Figure 1:
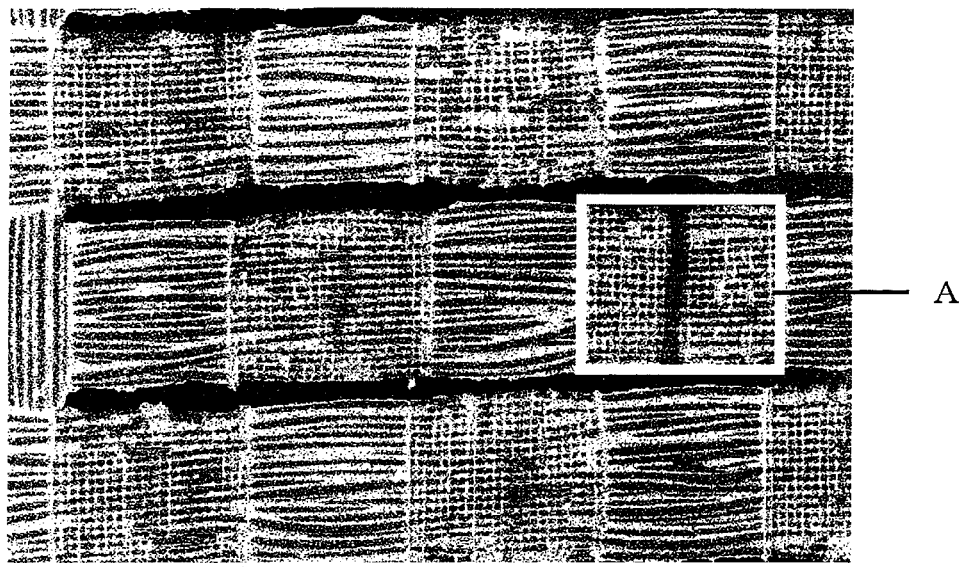
FIG. 1 shows that resin is distributed at an area ratio of 95% in an intertwined portion interface, with warp removed, in an air bag base fabric according to the present invention (fifty magnifications)
Figure 2:
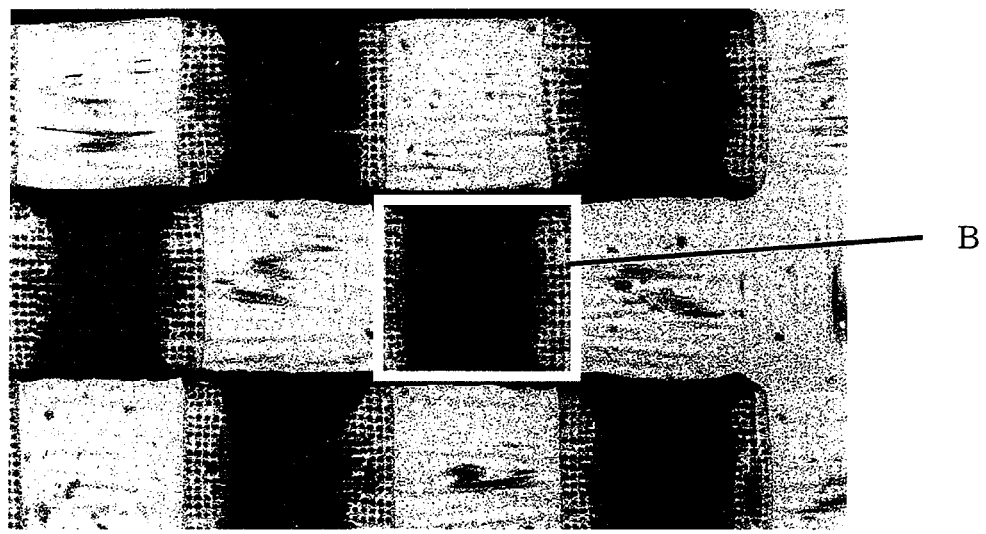
FIG. 2 shows that resin is distributed at an area ratio of 43% in an intertwined portion interface, with warp removed, in an air bag base fabric according to the prior art (fifty magnifications).

In the drawings, the reference marks A and B each represent an intertwined portion interface.

DETAILED DESCRIPTION OF THE INVENTION

The base fabric for an air bag according to the present invention is characterized in that, at the time of coating at least one surface of a synthetic fiber fabric with resin, the resin is allowed to impregnate not only into a surface portion to which the synthetic fiber fabric is exposed but also into an intertwined portion interface where warp and weft of the fabric are exposed, and the resin is distributed in an area ratio of at least 85% per total area of the intertwined portion interface at the intertwined portion interface which appears for the first time upon removal of the warp or weft present on the surface.

The "intertwined portion interface" herein means a portion where a warp and a weft of the fabric are in contact with each other while crossing and overlapping each other.

In the ordinary state of the fabric the intertwined portion interface is not exposed to the surface, in which portion warp and weft of the fabric are in contact with each other. Of course, this portion exerts a great influence on mechanical characteristics of the fabric. The present inventors found out that by distributing a sufficient amount of resin in the intertwined portion interface it was possible to let high flame retardancy be exhibited even when the total amount of applied resin was very small. In the case where the area ratio of resin in the intertwined portion interface is smaller than 85%, stitch dislocation is apt to occur and there is a fear that the flame retardancy and air shieldability may become insufficient.

By increasing the total amount of applied resin it is possible to improve the mechanical characteristics, as well as flame retardancy and air shieldability, of the synthetic fiber fabric. However, the fabric inevitably becomes heavier and deteriorated in texture and flexibility. The present invention exhibits its effect particularly when the amount of applied resin is set at 20 g/m$^2$ or less.

By the synthetic fiber fabric as referred to herein is meant a fabric produced by weaving synthetic fiber yarn. The fabric is superior in mechanical strength and in point of capable of being reduced in thickness. Textile weave is not specially limited. As examples thereof mention may be made of plain weave, twill weave, satin weave, as well as their fancy weaves and multishaft weaves. Particularly, plain weave is preferred which is superior in mechanical strength.

The kind of the synthetic fiber yarn is not specially limited. Examples thereof include polyamide fibers such as nylon 66, nylon 6, nylon 12 and nylon 46, polyester fibers such as polyethylene terephthalate and polybutylene terephthalate, polyolefin fibers such as polyethylene and polypropylene, polyvinyl alcohol fibers, polyvinylidene chloride fibers, polyvinyl chloride fibers, polyacrylonitrile fibers such as acryl, polyurethane fibers, aromatic polyamide fibers, and polyparaphenylene benzobisoxazole (PBO) fibers. Above all, polyamide fibers and polyester fibers are preferred on the ground that they are easy to manufacture and are superior in heat resistance, with polyamide fibers being more preferred on the ground of being superior in impact resistance and having a large heat capacity. Heat resistance improver, antioxidant, flame retarding agent and antistatic agent may be incorporated in those fibers.

The yarn form is not specially limited. For example, the yarn used in the invention may be filament yarn, spun yarn, blended yarn, combined filament yarn, intertwisted yarn, and corkscrew yarn. Above all, untwisted or soft-twisted filament yarn is preferred on the ground that it is superior in productivity, cost and mechanical strength and that low air permeability can be attained easily by the expanse of monofilament. A sectional shape of monofilament (also called a single fiber) is not specially limited. For example, it may be circular, flat, triangular, rectangular, parallelogram, hollow, or star-shaped. A circular section is preferred from the standpoint of productivity and cost and a flat section is preferred on the ground that the thickness of the fabric can be made small and therefore the stowability of the air bag is improved.

Monofilament strength is preferably 5.4 g/dtex or more, more preferably 7.0 g/dtex or more. If the monofilament strength is lower than 5.4 g/dtex, there is a fear that it may become difficult to satisfy physical characteristics required of the air bag.

The total yarn size is preferably 155 to 470 dtex, more preferably 235 to 470 dtex. If the total yarn size is smaller than 155 dtex, there is a fear that it may become difficult to maintain the strength of the fabric. If the total yarn size exceeds 470 dtex, the thickness of the fabric increases, with a consequent likelihood of deterioration in the stowability of the air bag. The resin used in the present invention is a coating resin higher in flame retardancy than the fabric. Usually there is used a silicone or a chloroprene-based heat-resistant elastomeric polymer. Above all, a silicone is preferred. By the term "silicone" is meant an elastomeric polymer having siloxane repeating units. The silicone is not specially limited. Examples include dimethyl silicone rubber, methylvinyl silicone rubber, methylphenyl silicone rubber, trimethyl silicone rubber, fluorosilicone rubber, methyl silicone resin, methylphenyl silicone resin, methylvinyl silicone resin, alkyd-modified silicone resin, epoxy-modified silicone resin, acryl-modified silicone resin, and polyester-modified silicone resin. Above all, methylvinyl silicone rubber is preferred on the ground of having rubbery elasticity after curing, being superior in strength and elongation and advantageous in point of cost.

Commercially available silicones are employable. Coating silicone solutions are available commercially as solventless type, solvent-diluted type and water dispersion type, which are employable in the present invention.

The silicone used in the present invention may contain another polymeric material such as a polyurethane or acryl polymer or a polyester for the purpose of diminishing the stickiness after curing of a silicone coating or for reinforcement of the silicone coating. It may further contain additives such as curing agent, adhesion improver, filler, reinforcing agent, pigment and flame retarding aid.

As the method for coating at least one surface of the synthetic fiber fabric with resin there is used a coating method using resin in a liquid state. Particularly preferred is a knife-on-bed method which performs coating in a sandwiched state of the synthetic fiber fabric between a coating knife and a bed. According to the knife-on-bed method, since a moderate pressure is applied to the synthetic fiber fabric from both surface and back, the penetration of resin into an intertwined portion is promoted, whereby it is presumed easy to increase the area ratio of the resin in the intertwined portion interface. It is preferable that the synthetic fiber fabric sandwiching force induced by the knife and the bed be set at 0.5 to 4.0 N/cm. The sandwiching force is a force obtained by dividing the force of pushing the knife to the synthetic fiber fabric by the width of the knife which is in contact with the fabric. If the sandwiching force is less than 0.5 N/cm, it is likely that the amount of applied resin will become too large, with consequent deterioration of the air bag stowability and flexibility and increase of the weight thereof. If the sandwiching force exceeds 4.0 N/cm, a uniform resin coating may not be formed on the surface of the synthetic fiber fabric. A more preferred sandwiching force is 1.0 to 3.0 N/cm. As another coating method there also may be adopted a floating method, provided the tension of the synthetic fiber fabric in coating and the knife edge pressure are adjusted appropriately.

The material of the bed is not specially limited, but a material having moderate elasticity such as natural rubber or synthetic resin is preferred. Particularly preferred is urethane resin which permits the fabrication of beds having various hardnesses.

As to the knife, a metallic one is preferred. Particularly, a stainless steel knife is preferred, taking into account its difficulty in rusting and high flexibility and abrasion resistance. The shape of the knife is not specially limited, but the edge thickness at the portion of contact with the synthetic fiber fabric is preferably 0.05 to 0.5 mm, more preferably 0.1 to 0.2 mm. If the edge thickness at the contact portion exceeds 0.5 mm, there is a fear that the amount of coating may become too large even if the sandwiching force is set large, with consequent deterioration of both stowability and flexibility and increase in weight. If the edge thickness is smaller than 0.05 mm, the edge strength at the tip corresponding to the portion of contact with the synthetic fiber fabric is insufficient and there is a fear that there may occur bending of the edge, causing variations in the amount of coating, as well as streaks, wrinkles and speckles.

In accordance with the conventional method, the resin coating is followed by drying and heat treatment (usually at 130° to 200° C.), whereby there is obtained a base fabric for an air bag. It is preferable that the amount of resin in the air $g/m^2$, more preferably 10 to 19 $g/m^2$. By making the resin present in such a small amount over at least 85% of the intertwined portion interface, it is possible to afford an air bag base fabric and an air bag both being light-weight, flexible and high in stowability, satisfying high air shieldability, heat resistance and flame retardancy, superior in adhesion between the resin coating and the fabric and difficult to undergo stitch dislocation and fray.

The production of the air bag from the air bag base fabric in the present invention can be done in accordance with a conventional method.

EXAMPLES

The present invention will be described below in more detail by way of working examples thereof. In the following Examples, evaluations were made by the following methods.
(1) Resin Interposition Ratio in Intertwined Portion:

This ratio is an area ratio of resin distributed in the intertwined portion interface of the air bag base fabric. Warp or weft is drawn out from the air bag base fabric and an intertwined portion interface of the exposed warp or weft is photographed in terms of a reflected electron image (composition image) from the resin applied surface side. For the photographing there was used a scanning electron microscope S-3000N (a product of Hitachi High Technologies Co., Ltd.). With the reflected electron image, it is possible to make distinction from the synthetic fiber surface because the resin deposited surface is stronger in luminance. The portion indicated at A in FIG. 1 represents one intertwined portion interface, in which resin is not present in the central dark portion. It is seen that on both sides of the central dark portion the fiber-to-fiber spaces are all filled with resin. The area of one intertwined portion interface is assumed to be 100%, while an area ratio of the resin-deposited portion is measured and is used an intertwined portion resin interposition ratio (%). The area of the resin-deposited portion indicates the area of the portion wherein the fiber-to-fiber spaces are filled with resin in the illustrated intertwined portion interface, i.e., an area obtained by subtracting the area of the resin-free central portion A from the area of the intertwined portion interface. Measurement was made at five places with respect to each of the warp and weft and an average value was used.
(2) Air Permeability:

This is for evaluating the air shieldability of the air bag base fabric and was measured in accordance with JIS L 1096 8. 27. 1 A method (Frazier method).
(3) Slip-off (or Edgecomb) Resistance:

This is for evaluating the degree of easiness of occurrence of stitch dislocation and fray of the air bag base fabric and was measured in accordance with the pin hooking method defined by JIS L1096 8. 21. 3 except that the width of a sample was changed to 1 cm.
(4) Bending Resistance:

This is for evaluating the flexibility of the air bag base fabric and was measured in accordance with JIS L1096 8. 19. 1 A method (45° cantilever method).
(5) Flame Retardancy:

Burning speed [mm/min] was measured by the method defined by FMVSS302 and was used for the evaluation of flame retardancy.

Example 1

Yarns of 470 dtex/72 filaments of nylon 66 fiber having a circular section were used as warp and weft and subjected to weaving. There was obtained a plain weave fabric having a warp weave density of 46 pc./2.54 cm and a like weft weave density. This fabric was then subjected to scouring and heat setting by a conventional method so that the warp weave density and the weft weave density were each kept at 46 pc./2.54 cm. Next, using a solventless type silicone resin with a viscosity of 15,000 mPa·s and using a stainless steel knife having an edge thickness of 0.1 mm at a portion of contact with the fabric and a urethane bed, the knife was pushed against the fabric at a sandwiching force of 2.5 N/cm to effect coating. Thereafter, heat treatment was performed at 180° C. for 60 seconds with use of a pin tenter dryer to afford a base fabric for an air bag having an applied resin quantity of 12 $g/m^2$. In an intertwined portion interface as a warp-weft crossing portion, the area ratio of the resin was 95% and the fabric was superior in all of flame retardancy, slip-off resistance, flexibility and air shieldability despite such a small coated resin quantity as 12 $g/m^2$.

Example 2

Using the same fabric as that having gone through weaving, scouring and heat setting in Example 1, coating was performed under the same conditions as in Example 1 except that there was used a stainless steel knife having an edge thickness at the contact portion of 0.2 mm and that the sandwiching force was set at 0.6 N/cm. Subsequent heat treatment was conducted also under the same conditions as in Example 1.

The air bag base fabric thus obtained was found to have an applied resin quantity of 18 $g/m^2$ and an area ratio of the resin of 100% in the warp-weft crossing intertwined portion interface. The air bag base fabric proved to be superior in all of flame retardancy, slip-off resistance, flexibility and air shieldability.

Example 3

Yarns of 470 dtex/72 filaments of nylon 66 fiber having a circular section were used as warp and weft and subjected to weaving. There was obtained a plain fabric having a warp weave density of 53 pc./2.54 cm and a like weft weave density. This fabric was then subjected to heat setting so that the warp weave density and the weft weave density were each kept at 53 pc./2.54 cm. Next, using a solventless type silicone resin with a density of 15,000 mPa·s and using a stainless steel knife having an edge thickness of 0.1 mm at a portion of contact with the fabric and a urethane bed, the knife was pushed against the fabric at a sandwiching force of 2.5 N/cm to effect coating. Thereafter, heat treatment was performed at 180° C. for 60 seconds with use of a pin tenter dryer to afford a base fabric for an air bag having an applied resin quantity of 15 g/m². In an intertwined portion interface as a warp-weft crossing portion, the area ratio of resin was 89% and the fabric was superior in all of flame retardancy, slip-off resistance, flexibility and air shildability despite such a small coated resin quantity as 15 g/m².

Comparative Example 1

Yarns of 470 dtex/72 filaments of nylon 66 fiber having a circular section were used as warp and weft and subjected to weaving. There was obtained a plain weave fabric having a warp weave density of 46 pc./2.54 cm and a like weft weave density. This fabric was then subjected to scouring and heat setting by a conventional method so that the warp weave density and the weft weave density were each kept at 46 pc./2.54 cm. Next, using a solventless type silicone resin with a viscosity of 15,000 mPa·s and using a stainless steel knife having an edge thickness of 0.1 mm at a portion of contact with the fabric and a urethane bed, the knife was pushed against the fabric at a sandwiching force of 6.0 N/cm to effect coating. Thereafter, heat treatment was performed at 180° C. for 60 seconds with use of a pin tenter dryer to afford a base fabric for an air bag having an applied resin quantity of 12 g/m. In an intertwined portion interface as a warp-weft crossing portion, the area ratio of the resin was 83%. This air bag base fabric was inferior in flame retardancy and slip-off resistance although it was superior in flexibility and air shieldability.

Comparative Example 2

Using the same fabric as that having gone through weaving, scouring and heat setting in Example 1, coating was performed by the floating method using a stainless steel knife with an edge thickness at the contact portion of 0.1 mm. The resin used was a solventless type silicone resin having a viscosity of 15,000 mPa·s. Thereafter, heat treatment was conducted under the same conditions as in Example 1 to afford an air bag base fabric having an applied resin quantity of 12 g/m².

The air bag base fabric thus obtained was found to have an area ratio of the resin of 77% in the warp-weft crossing intertwined portion interface and proved to be inferior in slip-off resistance although it was superior in flexibility, air shieldability and flame retardancy.

Comparative Example 3

Using the same fabric as the fabric having gone through weaving, scouring and heat setting in Example 1, the fabric was passed on a roller and was coated with resin by the knife-on-roll method using a knife set at an arbitrary gap width. As the resin there was used a solvent type silicone resin having a viscosity of 15,000 mPa·s. The knife was one generally called J blade and the edge thickness at the portion of contact with the fabric was 10 mm. Thereafter, heat treatment was performed under the same conditions as in Example 1 to afford an air bag base fabric having an applied resin quantity of 20 g/m². In an intertwined portion interface as a warp-weft crossing portion the area ratio of the resin was 43%. This air bag base fabric was inferior in flame retardancy and slip-off resistance although it was superior in flexibility and air shieldability.

TABLE 1

|  | Example 1 | Example 2 | Example 3 | Comparative Example 1 | Comparative Example 2 | Comparative Example 3 |
| --- | --- | --- | --- | --- | --- | --- |
| Total Size [dtex] | 470 | 470 | 470 | 470 | 470 | 470 |
| Number of Filaments [pc.] | 72 | 72 | 72 | 72 | 72 | 72 |
| Weave Density Warp/Weft [pc./2.54 cm] | 46/46 | 46/46 | 53/53 | 46/46 | 46/46 | 46/46 |
| Amount of Resin applied [g/m²] | 12 | 18 | 15 | 12 | 12 | 20 |
| Resin Interposition Ratio in Intertwined Portion [%] | 95 | 100 | 89 | 83 | 77 | 43 |
| Air Permeability [cc/cm²/sec] | 0 | 0 | 0 | 0 | 0 | 0 |
| Slip-off Resistance [N] | 51.6/41.2 | 43.4/46.4 | 76.1/75.8 | 19.6/17.3 | 35.9/34.6 | 35.9/43.2 |
| Bending Resistance Warp/Weft [mm] | 69/87 | 79/99 | 70/78 | 65/82 | 67/84 | 64/89 |
| Flame Retardancy [mm/min] | 65.8 | 67.1 | 51.2 | 144.2 | 72.6 | 129.2 |

The invention claimed is:

1. A base fabric for an air bag comprising a synthetic fiber fabric at least one surface of which is coated with resin, wherein said resin is present also over at least 85% of the total area of an intertwined portion interface where a warp and a weft of said synthetic fiber fabric are in contact with each other while crossing and overlapping each other.

2. A base fabric for an air bag as set forth in claim 1, wherein the amount of the resin applied is 20 g/m² or less.

3. A base fabric for an air bag as set forth in claim 1 or claim 2, wherein said resin is a heat-resistant elastomer.

4. A base fabric for an air bag as set forth in claim 3, wherein said elastomer is a silicone.

5. A method for producing a base fabric for an air bag, comprising:
　　applying a resin solution to at least one surface of a synthetic fiber fabric for an air bag; and
　　drying and then heat-treating the coated surface;
　　wherein said resin solution when applied is allowed to penetrate also into an intertwined portion as a warp-weft crossing portion of said synthetic fiber fabric, thereby applying the resin to at least 85% of the total area of an intertwined portion interface where a warp and a weft of said synthetic fiber fabric are in contact with each other while crossing and overlapping each other.

6. A method as set forth in claim 5, wherein a knife-on-bed method is used as resin applying means and said resin solution is applied to said synthetic fiber fabric under the condition that a sandwiching force of said knife and bed for said synthetic fiber fabric is 0.5 to 4.0 N/cm.

7. An air bag comprising the base fabric for an air bag described in any of claims 1 and 5.

* * * * *